ated Feb. 23, 1960

2,926,192

PREPARATION OF SOME NEW ALKYL-HALOBORANES

Gilbert Gavlin, Lincolnwood, and Richard G. Maguire, Chicago, Ill., assignors, by mesne assignments, to Callery Chemical Company, Pittsburgh, Pa., a corporation of Pennsylvania No Drawing. Application June 4, 1956
Serial No. 589,341

7 Claims. (Cl. 260—543)

This invention relates to some new alkylhaloboranes and a method of preparing them. In particular, it relates to the synthesis of a series of hitherto unknown alkylchloroboranes obtained by the alkylation of boron trichloride with butene-1.

Several alkylhaloboranes have been reported in the literature. Some of these include methylboron difluoride and dimethylboron fluoride which are prepared by the reaction of $BF_3$ with $(CH_3BO)_3$ and $(CH_3)_2BOB(CH_3)_2$ respectively. Others include bromovinylboron bromides and chlorovinylboron chlorides which are prepared by passing gaseous mixture of $BBr_3$ or $BCl_3$ and acetylene in a 1.5 to 1 ratio over a catalyst of HgCl on active carbon at 150–300° C. The alkylation of boron trichloride by butene-1 to yield such compounds as $$CH_3CH_2CHClCH_2BCl_2$$

$$(CH_3CH_2CHClCH_2)_2BCl \text{ and}$$

$$(CH_3CH_2CHClCH_2)_3B$$

has never been disclosed previously. The economic value of these new compositions of matter lies in the fact that they are useful as intermediates in the preparation of alkyldiboranes and alkylboranes.

One object of this invention is to provide new alkylchloroboranes. Another object is to provide a method for preparing these new alkylchloroboranes by the alkylation of boron trichloride with butene-1. Other objects will appear throughout the following specification and appended claims.

These new compositions of matter and a method for preparing them will be more fully described hereinafter and the novelty thereof will be particularly pointed out and distinctly claimed.

It is well known that addition polymerization is initiated by free radicals produced as fragments from the thermal degradation of organic peroxides present as the catalyst. This can cause the polymerization of an olefin as follows:

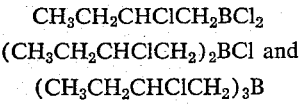

$$R\cdot + CH_2=CH_2 \rightarrow RCH_2CH_2\cdot$$

$$RCH_2CH_2\cdot + (n-1)CH_2=CH_2 \rightarrow R(CH_2CH_2)_n\cdot$$

Materials which may control the chain length, $n$, without radically changing the rate of reaction are called chain transfer agents. One such agent is carbon tetrachloride which if present in the above example will cause the following reaction to take place:

$$R(CH_2CH_2)_n\cdot + CCl_4 \rightarrow R(CH_2CH_2)_nCl + CCl_3\cdot$$

$$CCl_3\cdot + CH_2=CH_2 \rightarrow CCl_3CH_2CH_2\cdot$$

Thus, under conditions of extensive chain transfer the entire product may consist of $CCl_3CH_2CH_2Cl$.

The present invention is based upon the discovery that $BCl_3$ can be alkylated by butene-1 if the $BCl_3$ is used as a chain transfer agent under conditions which give extensive chain transfer but produce limited ionic polymerization of the olefin. In order to reduce the competition between transfer and polymerization, the chain transfer agent-olefin ratio should be as large as is convenient. It has been found that in the reaction of $BCl_3$ with butene-1 in the presence of a redox catalyst that the weight ratio should be 4.2 parts of $BCl_3$ to 1 part of butene-1. In this manner alkylchloroboranes such as $CH_3CH_2CHClCH_2BCl_2$ are formed.

In a series of experiments which were carried out, $BCl_3$ and butene-1 were reacted in a sealed Pyrex glass tube in the presence of a redox catalyst at room temperature for 24 hours. At the conclusion of the reaction period, the products were separated by simple distillation at atmospheric pressure and a heating bath temperature of 50–60° C. The yield is expressed as the residue thus obtained. The data is shown in the table below.

| Run No. | Peroxide Radical | Mol Percent Peroxide | Mol Percent $SnCl_2$ | $C_4H_8$ g. charged | $BCl_3$ g. charged | Yield as wt. percent of $C_4H_8$ |
|---|---|---|---|---|---|---|
| 1 | benzoyl | 1.0 | 1.0 | 11.2 | 47 | 107 |
| 2 | do | 1.0 | 0.1 | 11.2 | 47 | 54 |
| 3 | do | | | 8.5 | 36 | 1 |
| 4 | do | 1.0 | | 8.5 | 36 | 10 |
| 5 | lauroyl | 1.0 | 1.0 | 8.5 | 36 | 107 |

The products obtained in these runs all had the properties characteristic of alkylchloroboranes. For example, in runs 2 and 5 the alkali soluble fractions were 66 wt. percent and 60 wt. percent respectively. These solubilities are much too large to explain unless the boron trichloride was attacked by peroxide fragments followed by interaction with olefin to give the desired product. Run 3 shows that boron trichloride is not an acid catalyst at 25° C. and run 4 shows that butene-1 does not polymerize readily at 25° C. Using an approximate 4:1 weight ratio of $BCl_3$ to butene-1 produces $$CH_3CH_2CHClCH_2BCl_2$$

Increasing this ratio results in the formation of $$(CH_2CH_2CHClCH_2)_2BCl \text{ and}$$

$$(CH_3CH_2CHClCH_2)_3B$$

Any redox catalyst may be used if desired.

These new compositions of matter may be converted to monobutyl diborane, dibutyldiborane and tributylborane by reaction with a diethyleneglycol dimethyl ether solution of sodium borohydride. The liquid products thus produced are useful as high energy fuels in bipropellant systems in the same manner as the monoethyl-, diethyl- and triethyl analogs. The butyldiboranes and tributyl borane have a heat of combustion 20 to 50% greater than the conventional hydrocarbon fuels. When used in the combustion chamber of a jet test engine and burned with compressed air, these fuels which are derived from the new alkylchloroboranes herein described produce an engine thrust per unit weight of fuel considerably greater than that obtained from comparable hydrocarbon fuels. Since the engine output is directly proportional to the heat of combustion per unit weight of fuel, an aircraft using one of these boron containing fuels can travel proportionately further with the same load or carry a larger load than when operating on a hydrocarbon fuel.

In accordance with the patent statutes, this invention has been described fully and completely including what is now considered to be one of its best embodiments. However, it should be understood that other variations are possible and that within the scope of the appended claims this invention may be practiced otherwise than as specifically described.

What is claimed and desired to be secured by Letters Patent of the United States is:

1. A method of preparing an alkylchloroborane of the class consisting of 2-chlorobutyldichloroborane, bis (2-chlorobutyl) chloroborane and tris (2-chlorobutyl) borane which comprises reacting boron trichloride with butene-1 in the presence of a catalyst selected from the group consisting of benzoyl peroxide and lauroyl peroxide at room temperature and recovering the reaction product thus formed.

2. A method according to claim 1 in which a substantial excess of boron trichloride is used.

3. A method of preparing 2-chlorobutyldichloroborane which comprises reacting boron trichloride and butene-1 in a weight ratio of about 4:1 at room temperature in the presence of a redox catalyst consisting of one mol percent benzoyl peroxide and one mol percent stannous chloride based on the amount of butene-1 used and recovering the liquid reaction product formed.

4. A method of preparing an alkylchloroborane of the class consisting of 2-chlorobutyldichloroborane, bis (2-chlorobutyl) chloroborane and tris (2-chlorobutyl) borane which comprises reacting boron trichloride with butene-1 in the presence of an equimolar mixture of benzoyl peroxide and stannous chloride.

5. A method of preparing 2-chlorobutyldichloroborane which comprises reacting boron trichloride and butene-1 in a weight ratio of about 4 to 1 at room temperature in the presence of a redox catalyst consisting of equimolar parts of lauroyl peroxide and stannous chloride and recovering the liquid reaction product formed.

6. The new compositions of matter, $$(CH_3CH_2CHClCH_2)_nBCl_{3-n}$$

where $n$ is an integer from 1 to 3.

7. As a new composition of matter, the compound 2-chlorobutyldichloroborane having the formula $$CH_3CH_2CHClCH_2BCl_2$$

No references cited.